United States Patent [19]
Singh et al.

[11] Patent Number: 5,187,967
[45] Date of Patent: Feb. 23, 1993

[54] LASER TRIMMING OF FORGINGS

[75] Inventors: Jogender Singh, West Chester; Sulekh C. Jain, Cincinnati, both of Ohio; Thomas W. Lloyd, Chrewsbury, Vt.; Leroy A. Bates, Hampstead, N.H.; Denis Lacroix, Granby, Canada; Ernest B. Cooper, Jr.; Seetharamaiah Mannava, both of Cincinnati, Ohio; Serge B. Couture, Granby, Canada

[73] Assignee: General Electric Company, Cincinnati, Ohio

[21] Appl. No.: 760,656

[22] Filed: Sep. 16, 1991

[51] Int. Cl.$^5$ .................. B21D 53/78; D23K 26/00
[52] U.S. Cl. .................. 72/340; 219/121.69; 219/121.82; 29/889.7
[58] Field of Search .............. 72/340; 219/121.69, 219/121.68, 121.67, 121.72, 121.82; 29/889.7

[56] References Cited

U.S. PATENT DOCUMENTS

| | | | |
|---|---|---|---|
| 1,910,943 | 5/1933 | Wiberg | 29/889.7 |
| 3,029,497 | 4/1962 | Nelson | 29/889.7 |
| 4,081,655 | 3/1978 | Gale | 219/121.69 |
| 4,473,735 | 9/1984 | Steffen | 219/121.69 |
| 4,737,613 | 4/1988 | Frye | 219/121.72 |
| 4,842,782 | 6/1989 | Portney | 219/121.67 |
| 4,908,493 | 3/1990 | Susemihl | 219/121.72 |
| 5,083,008 | 1/1992 | Zerver | 219/121.69 |

FOREIGN PATENT DOCUMENTS

| | | | |
|---|---|---|---|
| 1-04435 | 4/1989 | Japan | 72/340 |
| 1303245 | 1/1973 | United Kingdom | 29/889.7 |

Primary Examiner—Daniel C. Crane
Attorney, Agent, or Firm—Jerome C. Squillaro; Carmen Santa Maria

[57] ABSTRACT

A hot forged article of a preselected profile is produced by heating a forging blank to elevated temperature and forging the blank at the elevated temperature between closed dies, to produce a forging of about the preselected profile of the final forging, but having flashing thereon. The flashing is removed by cooling the forging having flashing thereon to ambient temperature, and trimming the flashing from the forging by passing a trimming laser beam of sufficient power density to cut through the flashing along the preselected final profile of the forging. The forging may be post treated by passing a post treating excimer laser along the portion of the forging immediately adjacent the preselected profile, after the trimming laser has passed. The post treatment removes the heat affected zone, depending upon the energy level of the excimer laser.

19 Claims, 3 Drawing Sheets

LASER TRIMMING OF FORGINGS

BACKGROUND OF THE INVENTION

This application relates to the manufacturing of metal forgings, and, more particularly, to a process for preparing closed-die forgings and removing flashing from the forgings.

Forging is a widely used manufacturing technique for preparing metal articles. In a typical forging operation, a metal forging blank is pressed or pounded into a shape that is close to the preselected final shape. Forging is relatively economical for producing many articles, and additionally produces metal microstructures in the final article that may be beneficial to its performance. Forging is normally accomplished at an elevated temperature, because the strength of the metal is less at higher temperature than at lower temperatures, requiring less power to be expended in the forging operation.

The forging deformation can be accomplished by open die forging, in which the metallic piece is held against an anvil or a flat die and repeatedly struck by a hammer or a forging press. Many large shafts, for example, are prepared by open die forging. Open die forging is usually not intended to produce a highly precise final article.

The other approach to forging is closed die forging, in which two dies are prepared in the form of a negative pattern of the final desired article. The forging blank is placed between the die halves, and they are pressed or hammered together, causing the forging blank to deform to the shape defined by the two dies. In some instances a series of closed dies are used, with the forging blank progressively deformed toward the desired final shape. In many instances, closed die forgings can be made quite precise in shape and dimensions through careful design of dies, forging sequences, and forging conditions such as temperature.

An inevitable result of a closed die forging operation is flashing on the forging. Flashing is a thin layer of metal produced at the interface between the two die halves. It results because the outward flow of the metal under the forging pressure is constrained everywhere but the interface between the dies. The metal naturally extrudes outwardly between the forging dies, leaving the flashing on the sides of an otherwise perfectly formed part.

After forging, the flashing is usually removed from the part by trimming in a shear, grinding with an abrasive, or cutting with a blade, knife, or oxyacetylene torch. Trimming in a shear is relatively fast, but may be difficult to integrate into a high volume production operation due to time and temperature constraints on the shearing operation in relation to the forging operation. Shearing can be imprecise due to the difficulty of aligning the part in the shear, and because of dimensional changes that occur during and after shearing. The misalignment and dimensional changes can result in variable shearing pressures and subsequent shape variations in the part, which is undesirable. Achieving the necessary proper alignment in a shearing operation may be time consuming. Shearing can also cause the portion of the article remaining to be deformed in an unacceptable manner. Tools used in shearing are subject to wear, requiring periodic maintenance and replacement. Finally, shearing cannot be accomplished for some thick flashings, softer metals such as aluminum and unusually shaped forgings. Shearing is also not a reproducible operation because the temperature variations from part-to-part make process controls difficult.

Removal of flashing by grinding is precise, but slow and not practical for many high-volume production operations. Grinding, which is often a manual operation, is dependent upon the skill and care of the operator. Grinding may introduce substantial heat into the part, thereby forming an undesirable heat affected zone with different properties than the rest of the part. Grinding may also result in abrasive particles being embedded in the metal part, which can lead to degradation of the mechanical properties of the part.

There is a need for a technology of high volume forging production in which the removal of flashing is better integrated with the forging operation. The present invention fulfills this need, and further provides related advantages.

SUMMARY OF THE INVENTION

The present invention provides a closed die metal forging process that results in improvements to both the manufacturing process and the final forged part, as compared with prior forging processes. Requirements for precise temperature control are reduced, as are the amounts of operator attention and rework needed in the production operation. Tooling capital and maintenance costs are much less. Deformation forces on the part itself are zero, so that there is better dimensional control and stability than in prior processes. The present approach is applicable in a variety of closed die forging operations, but its use is particularly valuable in the forging of precision parts requiring the maintenance of fine tolerances.

In accordance with the invention, a process for producing a forging having a preselected final profile comprises the steps of furnishing a forging blank, heating the forging blank to elevated temperature, forging the forging blank at the elevated temperature between closed dies, to produce a forging of about the preselected profile of the final forging, but having flashing thereon, and cooling the forging having flashing thereon to a uniform temperature less than the forging temperature. The flashing is trimmed from the forging by passing a trimming laser beam of sufficient energy density to cut through the flashing along the preselected final profile of the forging. Desirably, after trimming a post treating laser beam such as that of an excimer laser is passed along the forging in the region adjacent the final profile, to reduce any adverse effects of the trimming process.

In the approach of the invention, the forging blank is forged in the usual manner at elevated temperature between closed dies. The volume of metal in the blank is greater than that required for the final part by some small amount, to ensure that the dies are fully filled in the forging operation. The excess metal is extruded out of the dies as a thin rim around the periphery of the forged part along the parting line of the dies, and is conventionally termed "flashing".

After the part with attached flashing is forged and an equilibrium temperature is achieved, the flashing is removed by passing a trimming laser beam along the final profile of the part, vaporizing the metal of the flashing along the locus at which it is attached to the part. The flashing is thereby cut from the part and removed.

The laser trimming operation may induce a heat affected zone (HAZ) immediately adjacent the trimmed edge of the forging. To reduce any adverse effects of such a HAZ, a post treating laser is passed along essentially the same path as the trimming laser, except displaced slightly so that the post treating laser removes the HAZ. The post treating laser is preferably an excimer laser, having a short wave length and short pulse duration. The energy of its beam is readily absorbed by the surface layers of the trimmed forging. The energy of the post treating laser beam may be adjusted to a level for ablating the HAZ by vaporizing material from the HAZ without adversely affecting the underlying substrate.

This approach to the forging of precision parts has important advantages both in respect to the economics of the manufacturing operation and in respect to the quality of the forged part. As to the manufacturing operation, the forging cell is much more efficient than in the prior approach wherein the flashing was removed by a hot shearing operation immediately after forging. The laser trimming approach permits the forging and trimming steps to be performed at different times and by different operations, permitting each individual operation to be optimized by itself. The laser trimming portion of the process is more readily automated than is a shearing step, resulting in lower cost and improved reproducibility and accuracy of the final part. Since laser trimming is conducted at a uniform temperature, preferably room temperature, there is no requirement for maintaining precise control over temperature in moving from the forging step to the trimming step. Since the laser and tooling can be operated under computer control, the laser trimming operation is readily applied to the trimming of complex forged shapes. The laser beam can cut through different thicknesses of flashing, and in particular can remove very thick flashings that cannot be removed by shearing. Laser trimming is also not limited to selected alloy types, as is the case for shearing, which cannot be effectively utilized for softer, ductile alloys.

The final forged part itself is superior to that obtainable with shearing, both dimensionally and metallurgically. Better dimensional control is attained because the laser trimming does not apply any mechanical forces to the part during the trimming operation. The tooling can therefore be designed for precision, not strength. Additionally, since a single temperature is reproducibly reached for the laser trimming operation, post-trimming thermally induced distortion and nonuniform shrinkage are avoided. The laser-trimmed edge is uniform, of good surface finish, and free of burrs. The metallurgical microstructure of the final part has no irregularities near the site of the flashing due to shearing deformation.

Laser trimming therefore offers an important advance to forging operations, in process economics and in final part characteristics. Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

In accordance with a preferred embodiment of the invention, a process for producing a forging having a preselected final profile comprises the steps of furnishing a forging blank, heating the forging blank to a hot working temperature greater than the minimum hot working temperature of the material of the forging blank, forging the forging blank at the hot working temperature between closed dies, to produce a forging of about the preselected profile of the final forging, but having flashing around the periphery thereof, and cooling the forging having flashing thereon to ambient temperature. The process further includes the steps of furnishing a laser trimming apparatus having a multi-axis positionable work table, tooling to support the forging having flashing in the laser trimming apparatus, a trimming laser having sufficient power to cut through the thickness of the flashing at all points on the periphery where flashing is found, a laser beam focus and directional control system, and a controller containing a programmed trimming sequence for the forging, mounting the forging blank having flashing on the periphery thereof in the tooling of the laser trimming apparatus, and trimming the flashing from the forging at ambient temperature by passing the laser beam through the flashing along the preselected final profile of the forging. The process may include the additional step of post treating the forging with a post treating laser to reduce the incidence of a heat affected zone adjacent the trimmed edge of the forging.

Laser trimming is particularly useful in the trimming of complex, semi-high production rate forgings that require exceedingly high quality of the final part. Examples of such forgings are aircraft gas turbine engine fan, compressor and turbine vanes and blades. Many steel, titanium-alloy, aluminum-alloy, cobalt-base superalloys, iron-base superalloys and nickel-base superalloy compressor blades and vanes are currently manufactured by forging and subsequent shear trimming of the flashing.

Figure 1:
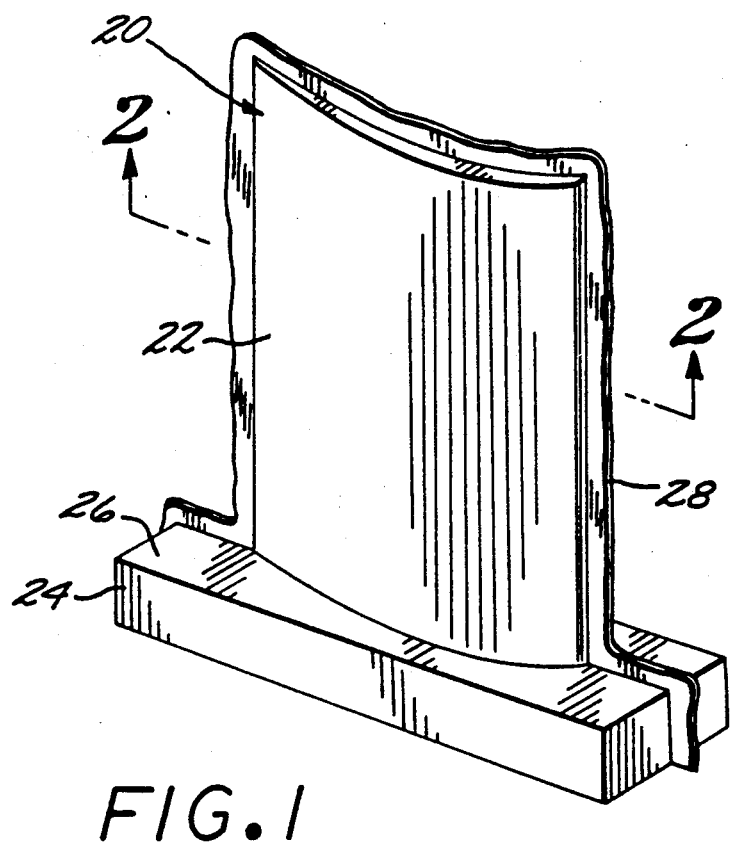
FIG. 1 is a perspective view of a gas turbine compressor blade, with attached flashing.
Figure 2:
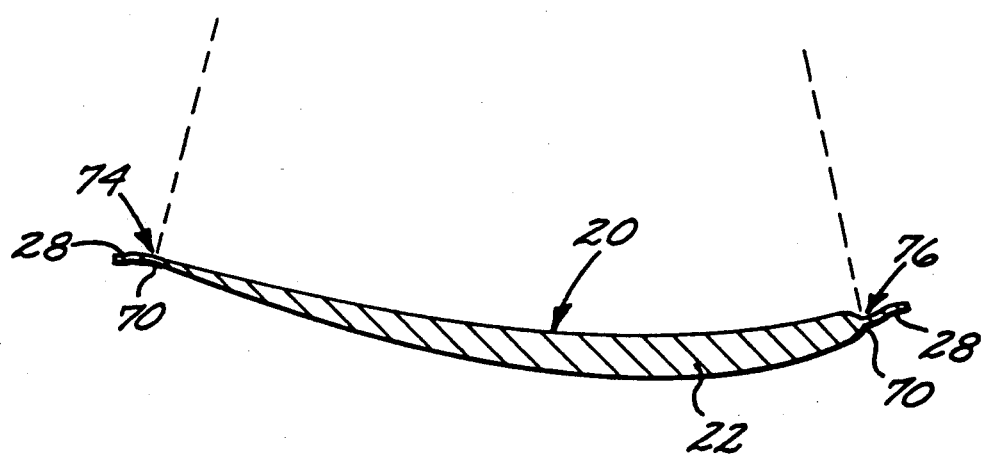
FIG. 2 is a sectional view of the compressor blade of FIG. 1, along line 2—2.

A blade 20, illustrated in FIG. 1, has a complex shape that is readily forged with proper forging dies. The blade 20 includes an airfoil 22, an attachment 24 by which the blade 20 is attached to a disk (not shown) when it is placed into service, and a platform region 26 that defines the transition between the airfoil 22 and the attachment 24. To prepare such a blade 20, a forging blank is heated to elevated temperature in a furnace. The elevated temperature is typically above the hot working temperature of the metal, and is known for each selected alloy. The blank is removed from the furnace and placed between two die halves in a forging press. The forging press is operated to force the die halves together, forming the blank to the shape shown in FIG. 1. The as-forged part is quite close to the preselected profile required, except that the dies are structured so that a rim of flashing 28 is produced around the periphery of the blade 20. FIG. 2 is a sectional view through the airfoil 22, showing the flashing 28 in relation to the body of the airfoil 22. In the trimming operation, the flashing 28 must be removed without damaging the airfoil 22.

After the part is forged between the dies, it is cooled to some lower temperature, preferably room (ambient) temperature. The laser trimming operation is preferably accomplished at room temperature, a relatively uniform temperature (since the laser trimming apparatus would normally be placed into an air-conditioned room) that is readily achieved and maintained. The cooling of the part to a readily maintained temperature such as room temperature is an important aspect and feature of the processing, since in conventional techniques for removing the flashing the part must be maintained at a uniform elevated temperature during the shearing step.

Figure 3:
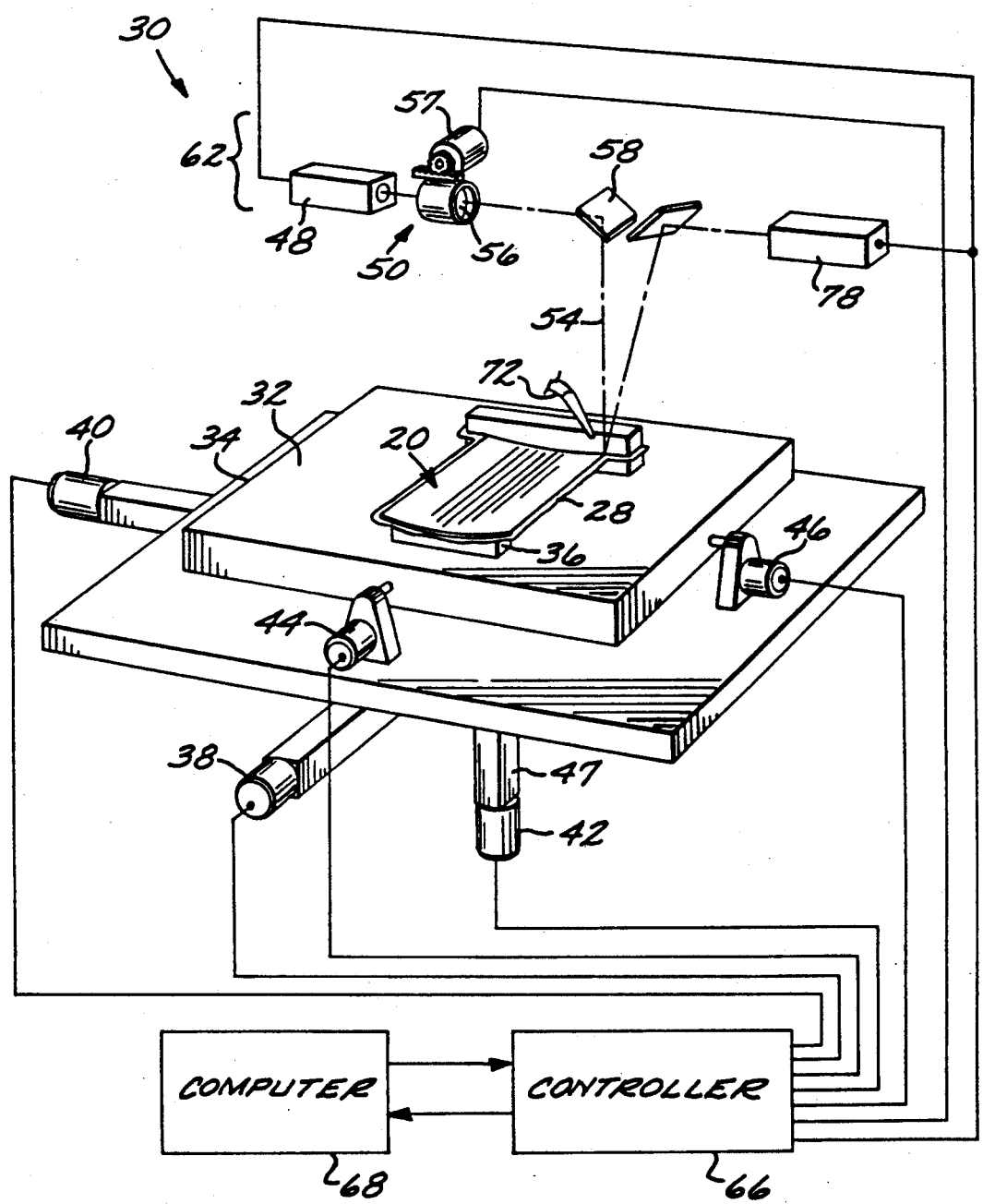
FIG. 3 is a schematic view of a laser trimming apparatus.

FIG. 3 schematically depicts a laser trimming apparatus 30 that trims the flashing 28 from the as-forged blade 20. The as-forged blade 20 is mounted on a top surface 32 of a movable table 34 using tooling 36 that supports the blade 20 with the blade 20 generally parallel to the surface 32. The apparatus 30 has controllable multi-axis movement capability, so that the table 34 (and thence the blade 20) may be oriented as required to permit laser trimming. The table 34 has translational drive mechanisms with motors, numerals 38, 40, and 42, that permit the table surface 32 to be controllably translated in an x-y plane (mechanisms 38 and 40) and in a z-direction perpendicular to the x-y plane of the table surface 32 (mechanism 42). The apparatus 30 further has rotational drive mechanisms with motors, numerals 44 and 46, that permit the table 34 and blade 20 to be tilted relative to two orthogonal axes in the plane of the table surface 32. Optionally, the apparatus 30 may have a rotational drive mechanism with motor, numeral 47, that permits the entire table 34 to be rotated about the axis perpendicular to the table surface 32.

The apparatus 30 additionally includes a trimming laser 48, which is preferably a carbon dioxide ($CO_2$) or a Nd:YAG laser having sufficient power to cut through the metal of the flashing at its thickest point about the periphery of the blade 20. The laser may be a pulsed or non-pulsed (continuous) laser. The apparatus 30 further has a focusing optical system 50 that produces a focused, directionally controllable laser beam 54. The focusing optical system includes a movable lens 56 mounted on a mechanism having a motor 57 that allows the focal point of the laser beam 54 to be moved relative to the blade 20, to permit the beam 54 to be focused or defocused as necessary during trimming. Equivalently, instead of using the focusing optical system to focus the laser on the flashing target, the entire table 34 can be moved vertically by the drive mechanism 42 to move the flashing material to the focus of the laser 48.

The trimming laser 48 and focusing optical system 50 are preferably mounted on a fixed laser head 62, with the table 34 movable relative to the laser head. Together, the translators 38, 40, and 42, rotational mechanisms 44, 46, and 47, and movable lens motor 57 permit the laser beam 54 to be directed toward any selected location along the periphery of the blade 20, with any selected angular orientation to the blade 20. (Some of the relative movement capability described may be redundant. In many instances, redundancy may be desirable to permit selection of relative movements in the most efficient manner.) The movement is controlled by a controller 66 and an associated computer 68. The computer 68 is typically programmed with the required final profile and the location of the blade 20 as determined by the tooling 36. The controller 66, which may be part of the computer 68 or a separate but connected unit, then translates the profile instructions to a set of commands to the motors so that the laser and blade move in the required path to permit the trimming, using well established techniques.

The movement of the apparatus 30 is controlled so that the laser beam 54 is directed toward the periphery of the blade 20 along the locus of points where the flashing 28 joins the body of the blade 20. In most instances, it is desired to maintain a constant angular orientation of the laser beam 54 with respect to a joined region 70 between the flashing and the blade. Most preferably, the laser is maintained perpendicular to the joined region 70, as shown at numerals 74 and 76 in FIG. 2. Maintaining a particular angle as the complexly shaped blade 20 is moved relative to the beam 54 by the translators 38, 40, and 42 is accomplished by table rotation using the mechanisms 44 and 46. Thus, in FIG. 2, the desired orientation of the laser beam and the blade 20 at different locations 74 and 76 along the periphery of the blade is attained by fixing the angular orientation of the laser beam 54 in space and rotating the table 34. The table is translated as required to move the entire periphery of the blade 20 to the laser beam 54. The table 34 may also be translated vertically to bring the flashing 28 to the focal point of the laser beam 54, or away from the focal point if less power is required.

As the metal of the joined region 70 is melted and vaporized by the laser beam 54, it may be desirable to remove any stray molten metal or stray vaporized metal so that it does not solidify on the blade 20 to cause a surface imperfection in the blade. This stray metal is removed by a flow of gas from a gas jet 72 directed toward the joined region 70, which directs the stray metal away from the blade surface. The gas jet, comprised of inert gases, also prevents oxidation of the surface and provides cooling to minimize the HAZ.

When the trimming laser is used to remove flashing, the high power density of the beam typically heats adjacent regions of the forging by conduction. The heated region is typically primarily confined to the surface of the forging, because the laser heat input occurs rapidly at the surface to be trimmed. The resulting heat affected zone or HAZ is generally small or nonexistent.

For applications in which a heat affected zone is sufficiently large to adversely affect the desired materials properties of the part, a post treatment laser may be included to reduce or eliminate the effect of the HAZ. The apparatus 30 may additionally include a post treatment laser 78 mounted to the laser head 62, with the beam of the post treatment laser 78 directed toward an area adjacent the beam 54 of the trimming laser 48. The beam 54 of the trimming laser 48 may equivalently be within the beam area of the post treating laser 78, at the location where they both impinge upon the blade 20. The post treatment laser may be an excimer laser, operating at short wave lengths and short pulse duration.

The post treatment laser 78 desirably will heat the HAZ immediately adjacent the area of the blade 20 from which flashing 28 is removed, after the trimming is complete and the flashing severed. The power density input from the post treatment laser into the HAZ of the forging immediately adjacent the trimmed region may be sufficient to heat the forging to a relatively low temperature, sufficient to anneal the heat affected zone. Preferably, the energy and associated energy density input from the post treatment laser is increased to a level to ablate or vaporize small amounts of heat affected metal from the surface of the forging. Preferably, the removal of the heat affected zone can improve the fatigue properties of the forging, because the heat affected zone may otherwise serve as the initiation site for fatigue cracks in the forging. The heated region then cools uniformly back to ambient temperature.

Figure 4:
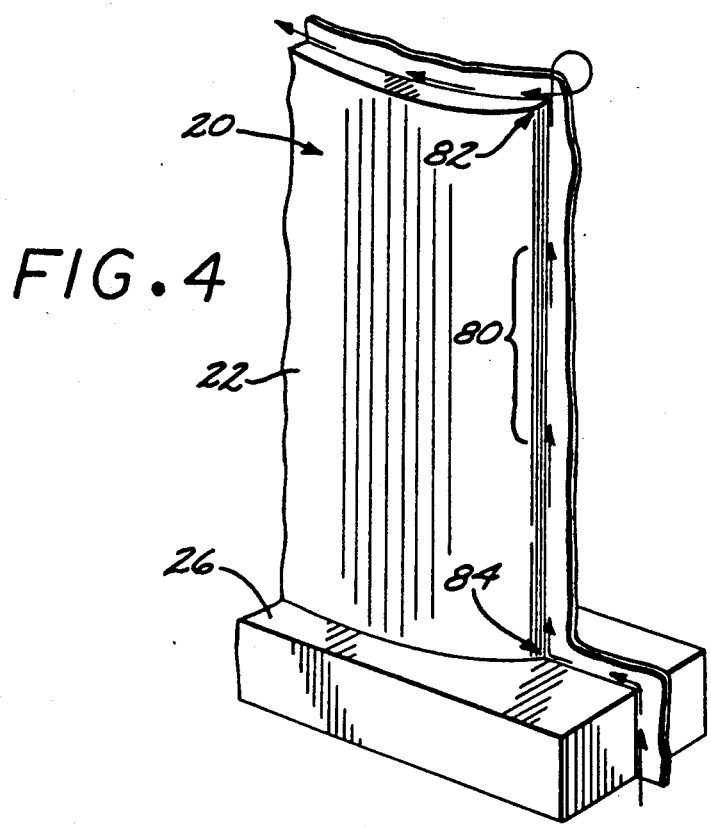
FIG. 4 is a schematic plan view of a trimming path of the laser with respect to the compressor blade.

Another reason for providing the post treating laser is illustrated in FIG. 4. When the trimming laser cuts the metal of the flashing 28 along the periphery of the blade 20, some heat flows into the blade 20. If the trimming laser moves at a constant rate along a straight or gently curved edge of the blade 20 to trim flashing, see numeral 80 in FIG. 4, the heat input to the blade at any point is essentially constant. At corners, however, there may be overlapping heating patterns so that some regions are heated to higher temperatures. This overheating can be minimized at outside corners, numeral 82, by moving the laser past the corner and then circling back in the new direction, as shown. Control of overlapping heat flow and overheating is more difficult at inside corners, numeral 84, because the laser cannot continue past the corner and then circle back in the new direction. The result is that, at inside corners 84 and to some extent at outside corners 82, there may be uneven heating and cooling patterns in the blade 20. These uneven patterns in turn cause the microstructure of the final blade to vary due to differing heat treatments.

To ensure virtually the same final degree of heat treatment and microstructure throughout, the post treatment laser 78 may heat all areas to the same temperature after the trimming operation is complete, so that the various areas can uniformly cool. Although the heating and cooling will not be precisely the same in all areas, they will be sufficiently close that the metallurgical microstructures will be virtually identical at all regions 80, 82, and 84 along the periphery of the trimmed blade 20.

Figure 5:
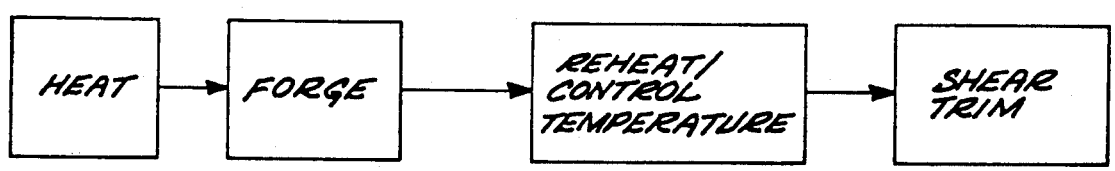
FIG. 5 is a block diagram of a forging operation using mechanical shearing to remove the flashing.
Figure 6:
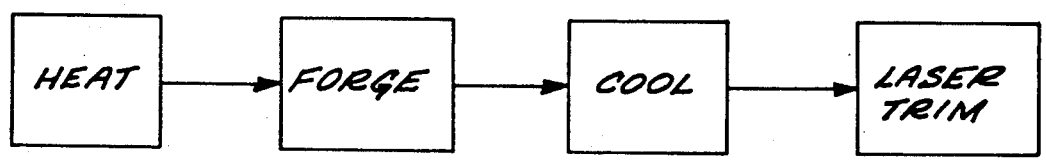
FIG. 6 is a block diagram of a forging operation using laser trimming to remove the flashing.

FIGS. 5 and 6 contrast the primary forging and trimming operations for shear trimming (FIG. 5) and laser trimming (FIG. 6). In both, the blade 20 is heated to the forging temperature in a furnace and forged. In the shear trimming operation, the blade and its attached flashing is immediately trimmed in a shear with shearing dies, or, optionally, placed back into a reheat or soaking furnace to bring it to a constant temperature for shearing. Shear trimming of the flashing is then performed. This approach requires careful control of the blade prior to trimming of the flashing, to be certain that every blade is sheared in the same temperature range established by a procedure. If the shearing is not accomplished in that temperature range, the shearing dies may be damaged or the final sheared blade may not be acceptably uniform with other sheared blades. While this may not seem on its face to be of great concern, experience has shown that failure to establish the shearing temperature properly may have major adverse effects on the final product. Great care and extensive controls are used to be certain that shearing occurs in the proper temperature range, and this slows down the production operation.

In laser trimming, on the other hand, the blade with attached flashing is cooled, preferably to ambient temperature. At ambient temperature, the blade with attached flashing may sit for a period of time, even days, before the flashing is removed in the apparatus 30. Work schedules are more flexible, and the joint efficiency of the forging and trimming operations is substantially increased. Both forging and trimming are better candidates for automation. The final product is also more uniform, because the possible variation due to temperature differences is avoided entirely, and the incidence of nonuniform thermal stresses is reduced.

Thus, the present approach for laser trimming of forging provides important advantages in both manufacturing and the final product. Although the present invention has been described in connection with specific examples and embodiments, it will be understood by those skilled in the arts involved, that the present invention is capable of modification without departing from its spirit and scope as represented by the appended claims.

We claim:

1. A process for producing a forging having a preselected final profile, comprising the steps of:
   furnishing a forging blank;
   heating the forging blank to an elevated temperature;
   forging the forging blank at the elevated temperature between closed dies, to produce a forging of about the preselected profile of the final forging, but having flashing thereon;
   cooling the forging having flashing thereon to a uniform temperature less than the forging temperature;
   furnishing a laser trimming apparatus having
      means for accurately positioning the forging,
      tooling to support the forging having flashing in the laser trimming apparatus,
      a trimming laser having a beam with sufficient power to cut through the thickness of the flashing at all points on the periphery where flashing is found,
      a laser beam focus and directional control system for a laser beam,
      a controller containing a programmed trimming sequence for the forging, and
      a post treating laser having a beam with sufficient energy to remove heat affected zone in the trimmed forging caused by the trimming laser, the post treating laser being mounted so that its beam is directed to a location adjacent that of the trimming laser;
   mounting the forging having flashing on the periphery thereof in the tooling of the laser trimming apparatus;
   trimming the flashing from the forging by passing the trimming laser beam through the flashing along the preselected final profile of the forging; and
   post treating the forging by passing the post treating laser beam along the portion of the forging immediately adjacent the preselected final profile of the forging, after the trimming laser has passed along the preselected profile to trim the flashing, to remove heat affected zone caused by the trimming laser so that the metallurgical microstructure of the trimmed forging is substantially uniform.

2. The process of claim 1, wherein the forging blank is made of a titanium alloy.

3. The process of claim 1, wherein the forging blank is made of a superalloy.

4. The process of claim 1, wherein the preselected final profile is that of an aircraft gas turbine airfoil.

5. The process of claim 1, wherein the preselected final profile is that of a compressor vane.

6. The process of claim 1, wherein the preselected final profile is that of a compressor blade.

7. The process of claim 1, wherein the preselected final profile is that of a turbine vane.

8. The process of claim 1, wherein the preselected final profile is that of a turbine blade.

9. The process of claim 1, wherein the preselected final profile is that of a fan blade.

10. The process of claim 1, wherein the elevated temperature in the step of heating is above the hot working temperature of the material of the forging blank.

11. The process of claim 1, wherein the uniform temperature reached in the step of cooling is ambient temperature.

12. The process of claim 1, wherein the trimming laser is a carbon dioxide laser.

13. The process of claim 1, wherein the trimming laser is a Nd:YAG laser.

14. The process of claim 1, wherein the trimming laser is a pulsed laser.

15. The process of claim 1, wherein the trimming laser a continuous laser.

16. The process of claim 1, wherein the means for accurately positioning is a five-axis positionable work table.

17. The process of claim 1, wherein the forging is made of aluminum alloy.

18. The process of claim 1, wherein the post treating laser is an excimer laser.

19. The process of claim 1, further including, after the step of trimming, the step of removing stray metal caused by the trimming operation by positioning a gas jet adjacent the trimming laser and directing a flow of inert gas from the gas jet onto the forging to direct the stray metal away the forging.

* * * * *